US006990188B2

(12) United States Patent
Rist et al.

(10) Patent No.: US 6,990,188 B2
(45) Date of Patent: Jan. 24, 2006

(54) METHOD FOR CALL ANSWERING IN A DISTRIBUTED COMMUNICATIONS SYSTEM (75) Inventors: Claus Rist, Bochum (DE); Roland Roth, Gelsenkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 54 days.

(21) Appl. No.: 10/189,192

(22) Filed: Jul. 5, 2002

(65) Prior Publication Data

US 2003/0103612 A1  Jun. 5, 2003

(30) Foreign Application Priority Data

Jul. 4, 2001  (DE)  ................................ 101 32 262

(51) Int. Cl.
H04M 3/42  (2006.01)
(52) U.S. Cl. ..................... 379/217.01; 379/207.02; 379/265.04
(58) Field of Classification Search .......... 379/217.01, 379/265.04, 265.01, 252, 374.02, 265.02, 379/207.02
See application file for complete search history.

(56) References Cited

U.S. PATENT DOCUMENTS 5,197,096 A * 3/1993 Sakuma et al. ......... 379/207.13
5,206,903 A * 4/1993 Kohler et al. ........... 379/265.12
5,590,188 A * 12/1996 Crockett ................. 379/265.02
5,844,896 A   12/1998 Marks et al.
5,933,488 A * 8/1999 Marcus et al. ......... 379/217.01
5,991,397 A * 11/1999 Han ....................... 379/373.04

FOREIGN PATENT DOCUMENTS

EP  0590863 A2  4/1994
EP  0802665 A2  10/1997
WO  WO00/76191 A1  12/2000

OTHER PUBLICATIONS

"Scenarios for Computer Supported Telecommunications Applications (CSTA) Phase II", ECMA Technical Report TR/68, ECMA Standardizing Information and Communication Systems, Dec. 1994, pp. 1-57.
"Services for Computer Supported Telecommunications Applications (CSTA) Phase II", ECMA Technical Report TR/68, ECMA Standardizing Information and Communication Systems, Dec. 1994, pp. 1-146.
German Patent Application No. 101 02 174.7.

* cited by examiner

*Primary Examiner*—Ahmad F. Matar
*Assistant Examiner*—Rasha S. Al-Aubaidi
(74) *Attorney, Agent, or Firm*—Staas & Halsey LLP

(57) ABSTRACT

A method for call answering in a distributed communications system having a plurality of communications devices, in which a subscriber can be registered on communications terminals associated with the communications devices in the distributed communications system. In this case, incoming calls are allocated to the communications terminals according to prescribable criteria. If a subscriber called by an incoming call is not available, an announcement function is performed which prompts activation of an announcement on a central communications device in the distributed communications system.

15 Claims, 7 Drawing Sheets

METHOD FOR CALL ANSWERING IN A DISTRIBUTED COMMUNICATIONS SYSTEM

CROSS REFERENCE TO RELATED APPLICATIONS

This application is based on and hereby claims priority to German Application No. 101 322 62.3 filed on Jul. 4, 2001, the contents of which are hereby incorporated by reference.

BACKGROUND OF THE INVENTION

A distributed communications system comprises a plurality of interconnected communications devices (e.g. call processing devices such as telecommunications installations or else data processing devices). Such a distributed communications system normally has one or more connections to public communications networks. Connection requests relating to a called subscriber within the distributed communications system are switched to the called subsriber's associated communications device on the basis of the dialed destination call number of the called subscriber. This communications device sets up a connection to a terminal associated with the called subscriber. The subscriber is associated with his terminal generally by a destination call number associated with the respective called subscriber.

In modern communications systems, a subscriber is frequently not associated with a terminal by a fixed destination call number, however. Instead, a subscriber logs onto a largely arbitrary communications terminal, e.g. by entering a code number, in order to have connection requests intended for him put through.

This method is found to be particularly advantageous for telephone service centers in which a shared collective call number can be used to reach a group of telephone operatives. In such a case, the selection criterion according to which an incoming call is put through would be the availability of a respective operative in this group, for example.

A mark of today's telecommunications is a convergence of telephony and data processing functions. The organization ECMA (European Computer Manufacturer Association) is therefore working on standards which make it possible to support telephony functions on a data processing workstation. The ECMA standard ECMA-269, 4th edition, June 2000: "Services for Computer Supported Telecommunications Applications (CSTA) Phase III" discloses, by way of example, a method for automatic call distribution, known in the technical field by the abbreviation ACD. In this context, for "ACD Devices Categories", that is to say physical (devices) or logical (software applications) telecommunications units, characteristic properties are defined which are described in section 6.1.3.4.3 "ACD Device Categories" of said standard. Activities taking place between these telecommunications units are managed by "agents" (cf. section 6.1.3.7, "Agent") using software, an agent representing a telecommunications unit onto which a subscriber has been logged by a logon process.

Telecommunications functions are incorporated within data processing installations by programming interfaces. The best known programming interfaces of this type are TSAPI (Telephony Service Application Programming Interface), TAPI (Telephony Application Programming Interface) and the CSTA standard ("Computer Supported Telecommunication Applications").

On the basis of the CSTA standard, in the case described above for a telephone service center, subscribers whose terminals are associated with a group are represented by an agent when a logon process has been performed using a registration function. Using this agent, a connection request arriving is distributed according to prescribable criteria, irrespective of the destination call number of the respective terminal. The registration function is in the form of software which is executed during the logon process, e.g. by entry of a code number by the subscriber who is logging on. This identifier is used to associate the subscriber logging on with a group.

The German patent application carrying the file reference 10102174.7 has proposed a method in which a plurality of communications devices in the same communications system are involved in call distribution, a group being able to comprise a plurality of communications devices within the communications system.

In many communications systems, the need arises for an automated call answering function to be provided. In the case of the aforementioned telephone service centers, this automated call answering has, by way of example, the function of informing a calling subscriber that he has been put in a queue and will be connected to the next available operative. On the other hand, automatic call answering can also have the function of informing the calling subscriber about the location of a called subscriber who is not available, and possibly of providing the calling subscriber with the opportunity to record a voice message.

Automated call answering can be managed and set by a subscriber on his terminal. The communications device to which the terminal of this subscriber is connected thus manages the—possibly subscriber-specific—voice message when this subscriber cannot be reached, and stores voice messages left for him. If a communications system contains a network of installations which comprises a plurality of communications devices, then the problem arises that, although a subscriber can log onto an arbitrary terminal on the basis of the German patent application specification's method described above, in which case he is not tied to a communications device associated with him, he is tied to his associated communications device for the purpose of managing his subscriber-specific, automated call answering.

SUMMARY OF THE INVENTION

One aspect of the present invention is based on the object of specifying a method which allows communications-device-independent selection of a communications terminal while at the same time having a subscriber-specific call answering function.

According to one aspect of the invention, if a subscriber is not available, an announcement function held on a central communications device in the distributed communications system is activated.

A fundamental advantage of the method can be seen in the localization of the announcement on a central communications device, which allows simple management of the announcement information for all the subscribers in the distributed communications system.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
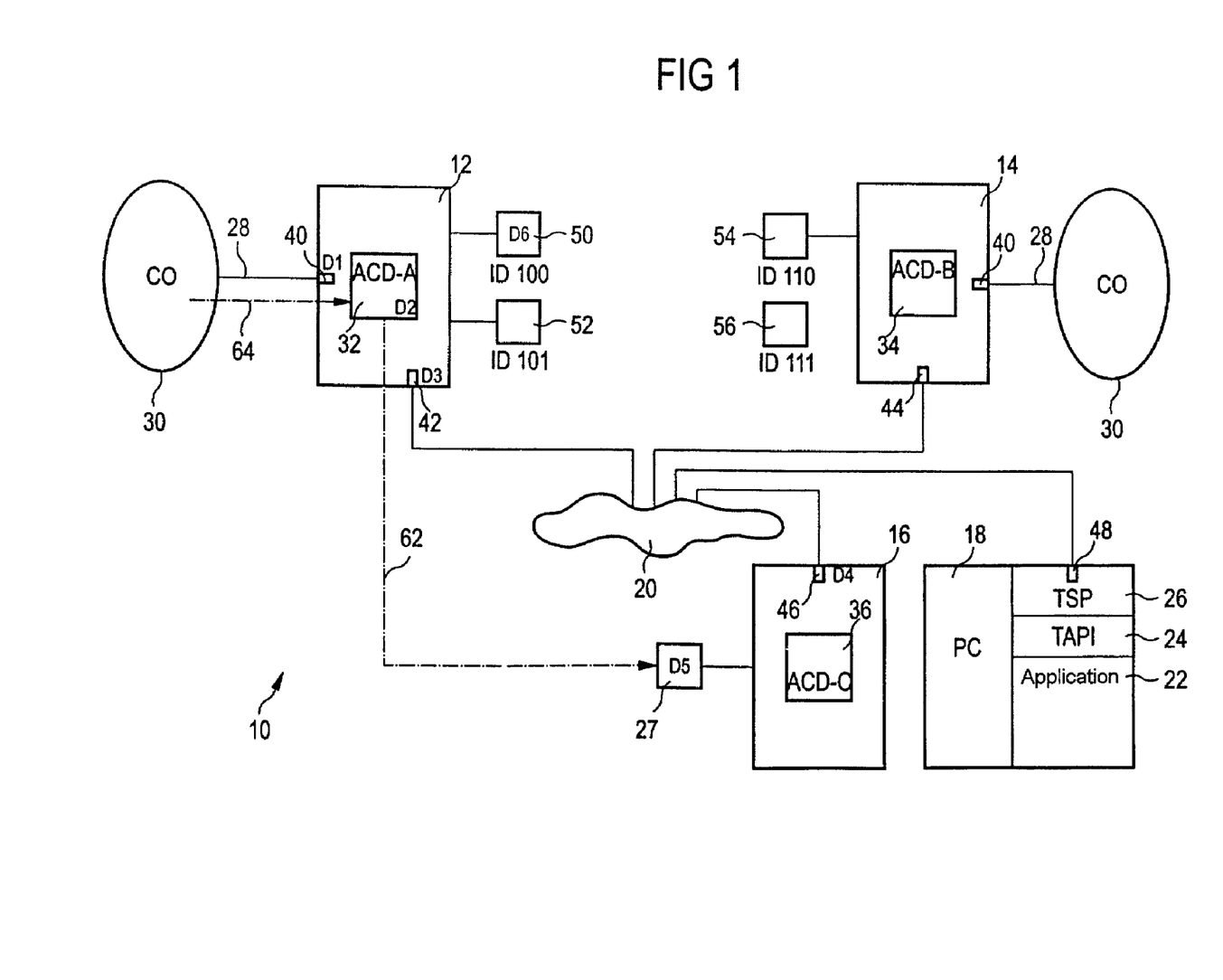
FIG. 1 shows a structogram for schematically illustrating a distributed communications system in accordance with the one embodiment of the invention.

FIG. 1 shows a communications system 10 comprising three communications devices 12, 14, 16—e.g. communications installations—, a data processing installation 18 and a local data transmission network 20. The data transmission network 20 is, by way of example, a packet-oriented data transmission network which connects the communications devices 12, 14, 16 to one another and respectively to the data processing installation 18. The communications devices 12, 14 arranged at the top in the drawing are connected via a line unit 40 and a line 28 to a communications device—not shown—in another communications system 30. The communications system 30 is a system which is external to the communications system 10 or is a functionally disconnected subsystem of the communications system 30.

The communications devices 12, 14, 16 each have automatic call distribution functions in "group programs" 32, 34, 36 which operate on the basis of the ACD functions (Automatic Call Distribution) of the ECMA standard ECMA-269 and are denoted in the drawing by ACD-A, ACD-B, ACD-C. As will be readily apparent, the communications devices 12, 14, 16 act as switches.

The data processing installation 18 is in the form of a personal computer (PC) containing a memory unit—not shown—and a central processor—not shown. The memory unit stores an application program 22 which contains, inter alia, functions for call distribution and for monitoring the messages interchanged in the communications system 10. The application program 22 uses a TAPI software interface 24 (Telecommunication Application Programming Interface) to communicate with a TSP program 26 (TAPI Service Provider). The TSP program 26 performs two-way conversion of TAPI commands and CSTA commands (Computer Supported Telecommunication Applications). On the basis of these CSTA commands, the communications units 12, 14, 16 and the data processing installation 18 communicate with one another via the data transmission network 20.

To denote physical or functional categories, "devices", identifiers D1 to D6 ("device") are used which are used firstly to refer to the respective unit and secondly as identification numbers for software implementation. The line unit 40 for connecting the line 28 to the communications device 12 has an associated identifier D1, and the group program 32 for this communications device 12 has the associated identifier D2. An interface 42 for this communications device 32 to the data transmission network 20 has the associated identifier D3, and the interface 46 for the communications device 16 to the data transmission network 20 has the identifier D4. A central announcement unit 27 associated with the communications device 16 has the identifier D5. A terminal 50 connected to the communications device 12 has the associated identifier D6.

In another embodiment (not shown), it is possible to implement the central announcement unit 27 as a software module located in the memory unit of the data processing installation 18, for example.

Connected to the communications devices 12, 14 are a multiplicity of terminals 50, 52, 54, 56, of which two terminals 50, 52; 54, 56 are respectively shown for the two communications devices 12, 14. The terminals 50, 52 connected to the communications device 12 can be reached using a shared collective call number, i.e. incoming calls are forwarded to one of the terminals 50, 52, 54, 56 by the call distribution function of the application program 22 according to criteria—which are explained in more detail.

A subscriber can log onto an arbitrary terminal by entering an individual identification number ID. A logged-on subscriber is thus involved in automatic call distribution by virtue of calls being put through to the terminal on which he is logged on. The subscriber logged onto the terminal 50 uses an identification number ID with the value "100", the subscriber logged onto the terminal 52 uses an identification number ID with the value "101", the subscriber logged onto the terminal 54 uses an identification number ID with the value "110", and finally the subscriber logged onto the terminal 56 uses an identification number ID with the value "111".

A call 64—shown in the drawing by a dash-dot arrow—arriving on the communications terminal 12 is forwarded to the central announcement unit 27 having the identifier D5 by the call distribution function of the group program 32 if a called subscriber logged onto the terminal 50 with the identification number ID 100 is not available. In the drawing, this forwarding 62 is shown by a dash-dot arrow.

The telecommunications units 12, 14, and 16 and the data processing installation 18 communicate with one another using messages based on the CSTA standard which are interchanged via the local data transmission network 20 using an IP-based (Internet Protocol) transmission protocol, for example. On the basis of the ECMA standard ECMA-269, 4th edition, June 2000, section 11 ("Template Descriptions"), these messages are divided into function-calling services and events, which each have identifying arguments (parameters).

To control the switching technology, the "call control" event messages and the associated service messages are used, in particular, which are described in ECMA standard ECMA-269, 4th edition, June 2000, section 17 ("Call Control Services & Events"). To control the agent states, the "Logical Device Features" event messages and the associated service messages from section 22 ("Logical Device Features") of said standard are used. Announcements are controlled using "Voice Unit" event messages and associated service messages in line with section 26 ("Voice Unit Services & Events") of said standard.

Interchange of CSTA messages for the purpose of implementing the method is explained in more detail below with further reference to the functional units in FIG. 1.

FIGS. 2A, 2B, 2C and 2D show messages which are interchanged between the application program 22 and the units 40, 32, 27, 50 having the identifiers D1, D2, D5 and D6 during automatic switching of an incoming call. Timelines 100, 102, 104, 106 and 108 are associated in this order with the application program 22 and with the units 40, 32, 27, 50 having the identifiers D1, D2, D5 and D6. The timelines 100 to 108 run from top to bottom, so that later times are further down than earlier times.

Figure 2A:
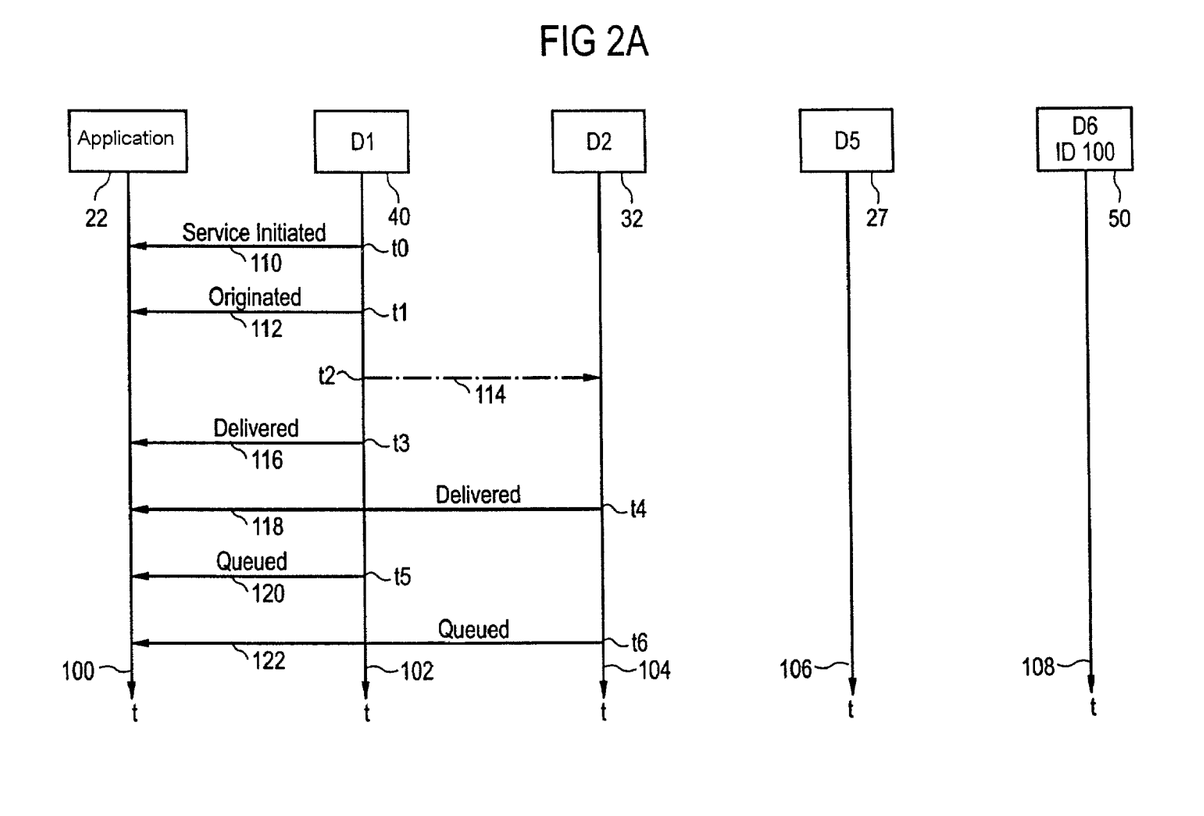
FIGS. 2A to 2D show a chronological flow diagram for schematically illustrating messages produced when the centralized announcement function is activated.

It will be assumed that a subscriber has logged onto the terminal 50 having the code number D6, in which case he has entered his identification number ID with the value "100" in the course of the logon process. This logon process entails generating an agent, which is acknowledged by the call distribution system by the event "Agent Log In", which contains the following parameters:

| | |
|---|---|
| agentDevice | D6, |
| agent ID | 100, |
| acdGroup | A. |

This logon process also involves the terminal 50 in call distribution.

Before the call 64 arrives, the application program 22 has involved the line unit 40, the group program 32 and the terminal 44 in a monitoring function—often referred to in the technical field as "monitoring", and not shown in the drawing. This is done using the CSTA message "Monitor Start" described in said ECMA standard, section 15 ("Monitoring Services"). On the basis of the monitoring function initiated by the "Monitor Start" service, the application program 22 can track the operations in the telecommunications units ("devices") involved in the monitoring, that is to say the line unit 40, the group program 32, the announcement module 27 and the terminal 50. Monitored event messages are therefore shown as arrows routed from one of the aforementioned telecommunications units to the application program 22.

These event messages entailing central announcement control are explained below with reference to the drawing and with a description of their CSTA message structure in chronological order.

On the basis of the call 64 arriving—before the time t0—the line unit 40 produces, at the time t0, an event message 110 which is referred to as a "Service Initiated" message according to the standard and contains the following parameters, inter alia:

| | |
|---|---|
| initiatedConnection | D1C1, |
| intiatingDevice | D1, |
| localConnectionInfo | Initiated, |
| cause | new Call, |
| callLinkageData | G1, T1. | where the identifier D1 is concurrent with the identifiers explained above with reference to FIG. 1, and C1 denotes a logical connection path—also called "connection" in the technical field—for the connection which is yet to be set up between the line unit 40 denoted by the identifier D1 and a communication party, to be determined below. The shorthand G1 denotes a global identifier, and the shorthand T1 denotes a thread identifier. Global identifiers and thread identifiers are explained in more detail in another context in the CSTA standard, 2000 edition. This also gives other explanations relating to the semantics of the parameters, whose illustration would come outside of this scope.

At a subsequent time t1, the line unit 40 produces an event message 112, which is referred to as an "Originated" message according to the CSTA standard and whose function it is to indicate a completed dialing operation by the incoming call 64. It contains the following parameters, inter alia:

| | |
|---|---|
| originatedConnection | D1C1, |
| callingDevice | D1, |
| calledDevice | D2, |
| localConnectionInfo | Connected, |
| cause | new call, |
| associatedCallingDevice | D2, |
| callLinkageData | G1, T1. |

At a time t2, the line unit 40 sends a communications-device-internal setup message 114—shown by a dash-dot line—to the group program 32 in order to set up a connection between the line unit 40 and the associated group program 32.

At a time t3, the previously transmitted setup message 114 causes the line unit 40 to send an event message 116, which is referred to as a "Delivered" message in line with the CSTA standard and indicates allocation of the call to a destination device—in this case the group program 32 with the identifier D2. This event message contains the following parameters, inter alia:

| | |
|---|---|
| connection | D2C1, |
| alertingDevice | D2, |
| callingDevice | D1, |
| calledDevice | D2, |
| originatingNIDConnection | D1C1, |
| localConnectionInfo | Connected, |
| cause | Entering Distribution, |
| associatedCallingDevice | D1, |
| callLinkageData | G1, T1. |

The setup message 114 received also causes the group program 32 to send a CSTA message 118 to the application program 22 at a time t4, said CSTA message being referred to as a "Delivered" message in line with the CSTA standard and containing the following parameters, inter alia:

| | |
|---|---|
| connection | D2C1, |
| alertingDevice | D2, |
| callingDevice | D1, |
| calledDevice | D2, |
| originatingNIDConnection | D1C1, |
| localConnectionInfo | Alerting, |
| cause | Entering Distribution, |
| associatedcallingDevice | D1, |
| callLinkageData | G1, T1. |

The line unit 40 first puts the incoming call 64 into a handling queue. When the call request has been put into the handling queue, an event message 120 is sent to the application program 22 at a time t5, said event message also being referred to as a "Queued" message in line with the CSTA standard and indicating queuing. It contains the following parameters, inter alia:

| | |
|---|---|
| queuedConnection | D2C1, |
| callingDevice | D1, |
| calledDevice | D2, |
| localConnectionInfo | Connected, |
| cause | No Available Agents, |
| associatedCallingDevice | D1, |
| callLinkageData | G1, T1. |

The group program 32 likewise puts the incoming call request into its handling queue and—at a time t6—for its part sends a "Queued" message 122 to the application program 22, said "Queued" message containing the following parameters, inter alia:

| | |
|---|---|
| queuedConnection | D2C1, |
| callingDevice | D1, |
| calledDevice | D2, |
| localConnectionInfo | Queued, |
| cause | No Available Agents, |
| associatedCallingDevice | D1, |
| callLinkageData | G1, T1. |

The cause, transmitted using the argument "cause", of queuing is that an agent associated with the terminal 50 having the identifier D6 is not available ("No Available Agents"). The reason for this lack of availability can, by way of example, be that the subscriber—initially assumed to be logged on—cannot currently take a call on this terminal 50, for example because he is currently involved in a call.

It is necessary to make the calling subscriber—more precisely the subscriber initiating the incoming call 64—aware that the called subscriber logged onto the terminal D6 is not available by an announcement. In this regard, the text below describes CSTA messages which are involved and accompany the setup of a connection path to the central announcement module 27.

Figure 2B:
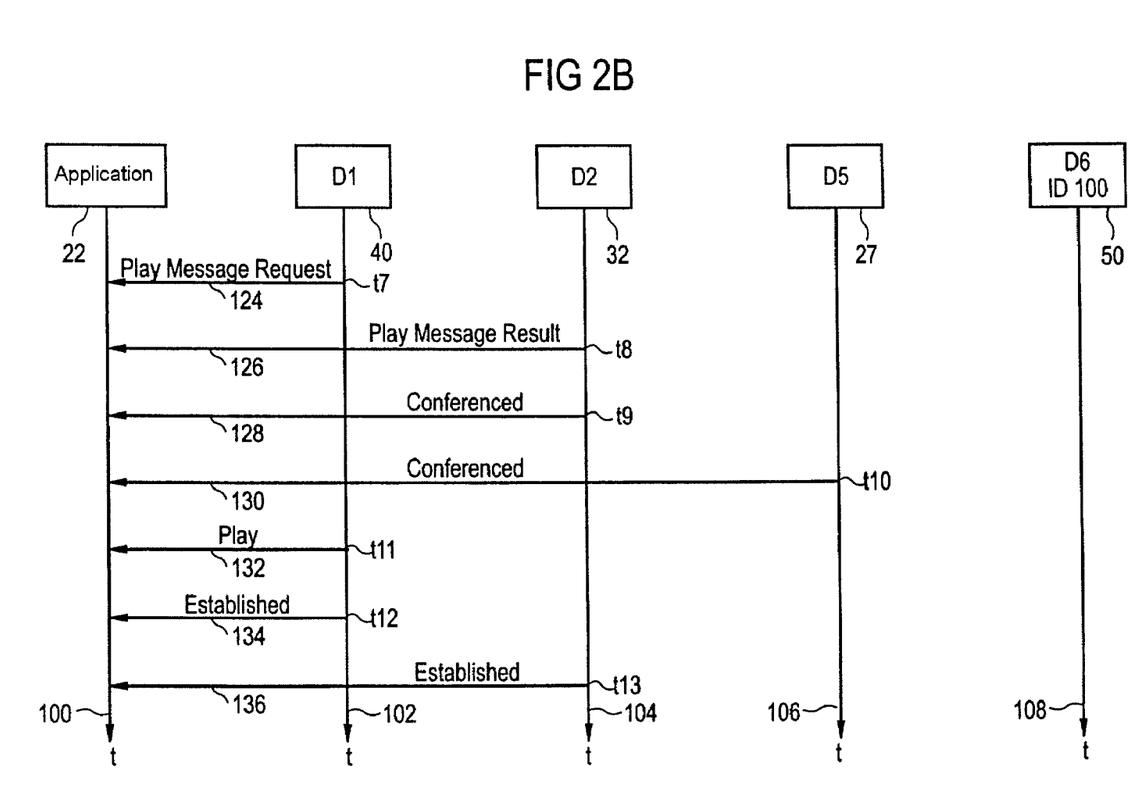

At a time t7, the line unit 40 prompts a request for the central announcement module 27. This announcement module 27 is also denoted by the shorthand VRU ("Voice Response Unit") in the vernacular of the ECMA standard. The associated "Play Message Request" request message 124 to the application program 22 contains the following parameters, inter alia:

| | |
|---|---|
| messageToBePlayed | D5, |
| overConnection | D1C1. |

This request message 124 is acknowledged by the group program 32 at the time t8, using a positive confirmation message 126 "Play Message Result".

Subsequently, the group program 32, in comparable fashion to a conference call, sets up a connection path—which has been denoted by C1 in the parameters of the preceding event messages—between the line unit 40 having the identifier D1 and the interface 42 having the identifier D3, the connection to the group program 32 being kept in the waiting state ("queued") because the agent representing the terminal 50 with the identifier D6 is not available. The interface 42 with the identifier D3 for the communications device 12 is connected, inter alia, to the interface 46 having the identifier D4 for the communications device 16 via the local data transmission network 20. From this interface 46, a further conference call prompted by the group program 36 associated with the communications device 16 is used to set up a connection path (denoted by "C2" in the event messages ensuing below) to the central announcement unit 27. These two conference calls are reported to the application program 22 by the two subsequent event messages as part of the monitoring function.

At a time t9, a connection path C1 which has been set up causes the group program 32 to send an event message 128, which is referred to as a "Conferenced" message in line with the CSTA standard and indicates to the application program 22 that another connection to the central announcement unit 27 with the identifier D5 has been involved in the existing, waiting connection. This event message contains the following parameters, inter alia:

| | |
|---|---|
| primaryOldCall | D2C1, |
| ConfController | D2, |
| addedParty | D5, |
| newConnection | D1C1, |
| oldConnection | D1C1, |
| deviceID | D1, |
| newConnection | D2C1, |
| oldConnection | D2C1, |
| deviceID | D2, |
| newConnection | D3C1, |
| deviceID | D5, |
| localConnectionInfo | Queued, |
| cause | Single Step Conference, |
| newCallLinkageData | G1, T1, |
| oldCallLinkageData | G1, T1. |

At a time t10, a connection path C2 which has been set up causes the group program 36 to send an event message 130, which is referred to as a "Conferenced" message in line with the CSTA standard. This message 130 is used to notify the application program 22 that the connection to the central announcement unit 27 has been set up and at the same time the call is still in the queue. This message 130 contains the following parameters, inter alia:

| | |
|---|---|
| primaryOldCall | D4C2, |
| confController | D2, |
| addedParty | D5, |
| newConnection | D4C2, |
| oldConnection | D4C2, |
| deviceID | D1, |
| newConnection | D4C2, |
| oldConnection | D4C2, |
| deviceID | D2, |
| newConnection | D5C2, |
| deviceID | D5, |
| localConnectionInfo | Queued, |
| cause | Single Step Conference, |
| newCallLinkageData | G1, T1, |
| oldCallLinkageData | G1, T1. |

The central announcement unit 27 then prompts playback of the announcement. This event is reported at a time t11 by an event message 132, which is referred to as a "Play" message in line with the CSTA standard and contains the following parameters, inter alia:

| | |
|---|---|
| message | D5, |
| connection | D1C1. |

In addition, in the subsequent three messages, the monitored line unit 40, the monitored interface 42 and the central announcement unit 27 report successful setup of the connection from the line unit 40 to the central announcement unit 27.

At a time t12, the line unit 40 sends an event message 134, which is referred to as an "Established" message in line with the CSTA standard and indicates to the application program 22 that the connection has now been made. The message 134 contains the following parameters, inter alia:

| | |
|---|---|
| EstablishedConnection | D3C1, |
| answeringDevice | D5, |
| callingDevice | D1, |
| calledDevice | D2, |
| originatingNIDConnection | D1C1, |
| localConnectionInfo | Connected, |
| cause | Remains in Queue, |
| associatedCallingDevice | D1, |
| callLinkageData | G1, T1. |

At a time t13, the group program 32 sends an event message 136, which is referred to as an "Established" message in line with the CSTA standard and contains the same parameters as the event message 134.

At a time t14, the central announcement unit 27 sends an event message 138, which is referred to as an "Established" message in line with the CSTA standard and contains the same parameters as the event message 134.

Figure 2C:
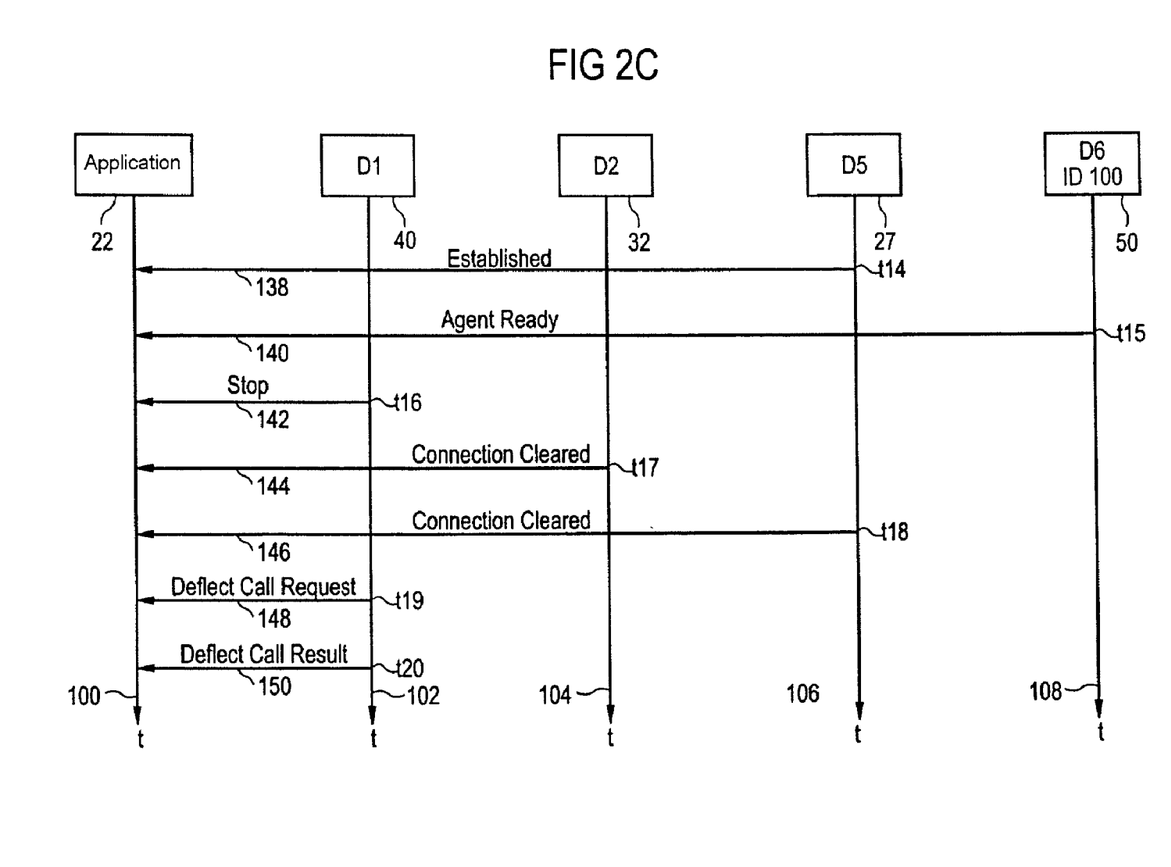

It is subsequently assumed that the agent associated with the subscriber having the identification number ID 100 is "released". Release of this agent is to be understood to mean that the subscriber represented by this agent can take incoming calls again on his terminal 50, having the identifier D6, which is associated with him as a result of logging on using his identification number ID 100, for example because he has ended a call. At a time t15, the terminal 50 uses an event message 140, which is referred to as an "Agent Ready" message in line with the CSTA standard, to signal to the application program 22, with the involvement of the group program 32, that it is ready to accept further calls within the scope of call distribution. This event message contains the following parameters, inter alia:

| | |
|---|---|
| agentDevice | D6, |
| agentGroup | ACD Group, |
| agentID | 100. |

The release of the agent now sets activities in motion which result in the announcement function stopping and in the connection path being diverted again. The connection path, starting from the subscriber initiating the incoming call 64, is changed over from the temporary destination—the central announcement unit 27—to the subscriber now being called on the terminal 50 having the code number D6.

To this end, at a time t16, the line unit 40 sends an event message 142, which is referred to as a "Stop" message in line with the CSTA standard and contains the following parameters, inter alia:

| | |
|---|---|
| message | D5, |
| agentGroup | D1C1. |

This message reports that the announcement function has been stopped by the central announcement unit 27.

At a time t17, the group program 32 sends an event message 144, which signals that the connection has been terminated and which is referred to as a "Connection Cleared" message in line with the CSTA standard, and which indicates to the application program 22 that the connection to the interface 42 having the identifier D3 has been broken. This event message 144 contains the following parameters, inter alia:

| | |
|---|---|
| droppedConnection | D3C1, |
| releasingDevice | D3, |
| localConnectionInfo | Queued, |
| cause | normal Clearing, |
| callLinkageData | G1, T1. |

At a time t18, the announcement unit 27 sends an event message 144, which signals that the connection has been terminated and which is referred to as a "Connection Cleared" message in line with the CSTA standard. This event message 146 contains the following parameters, inter alia:

| | |
|---|---|
| droppedConnection | D3C1, |
| releasingDevice | D3, |
| localConnectionInfo | Queued, |
| cause | normal Clearing, |
| callLinkageData | G1, T1. |

At a time t19, the line unit 40 sends a request message 148, which is referred to as a "Deflect Call Request" message in line with the CSTA standard and contains the following parameters, inter alia:

| | |
|---|---|
| callToBeDiverted | D2C1, |
| newDestination | D6. |

This message starts to prompt diversion to the terminal 50 having the code number D6.

At a time t20, the line unit 40 confirms receipt of the CSTA message 148 using a CSTA message 150, which is sent to the application program 22. This CSTA message 150 is also referred to as a "Deflect Call Result" message in line with the CSTA standard and contains no parameters.

At a time t21, the line unit 40 sends an event message 152 to the application program 22, which event message is also referred to as a "Diverted" message in line with the CSTA standard and indicates to the application program 22 that a logical device has been transferred to an agent. The message 152 contains the following parameters, inter alia:

| | |
|---|---|
| connection | D2C1, |
| divertingDevice | D2, |
| newDestination | D6, |
| localConnectionInfo | Null, |
| cause | distributed, |
| associatedCallingDevice | D1, |
| callLinkageData | G1, T1. |

At a time t22, the program group 32 likewise sends an event message 154 to the application program 22. The event message 154 is also referred to as a "Diverted Event" message in line with the CSTA standard and contains the same parameters as the message 152.

Figure 2D:
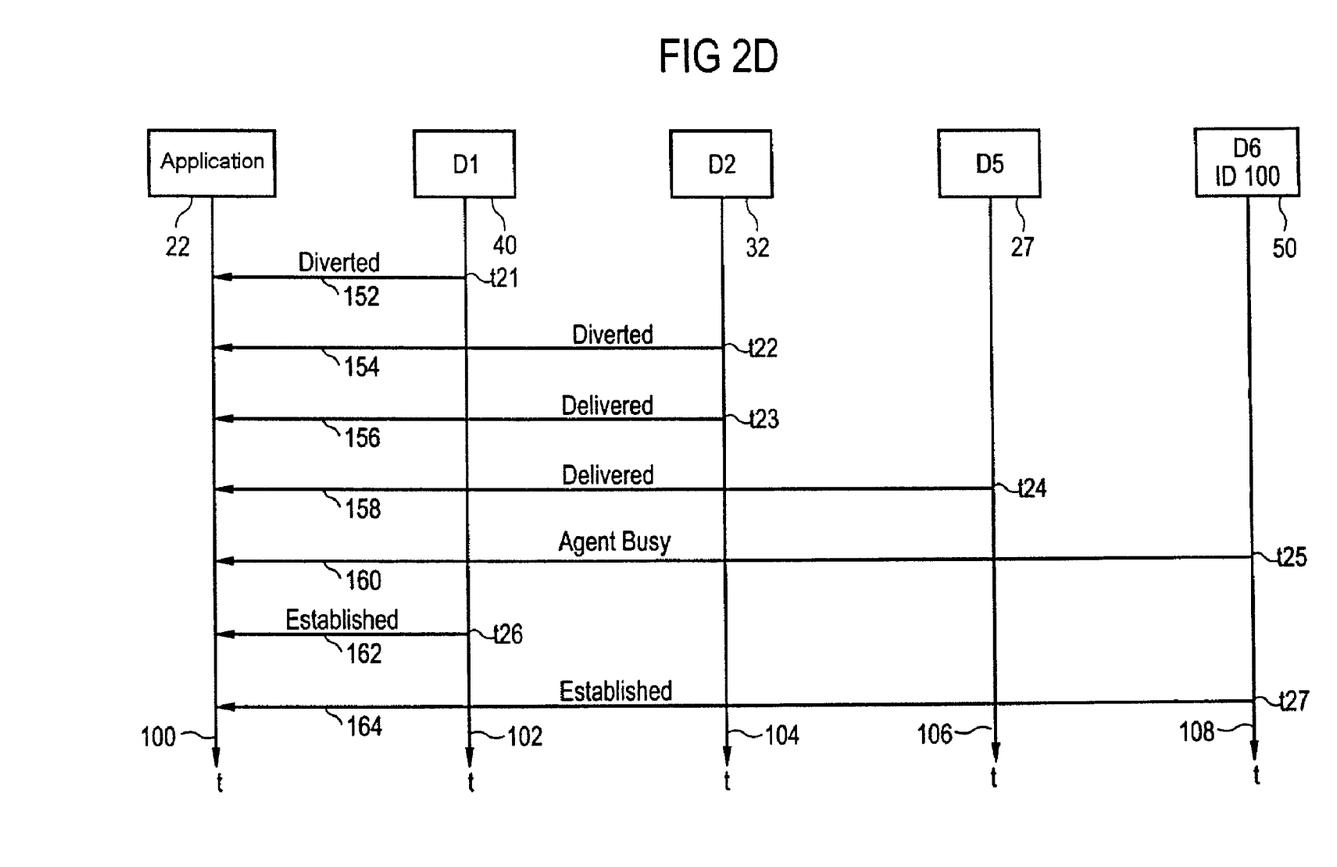

At a time t23, the group program 32 sends an event message 156 to the application program 22, which event message is also referred to as a "Delivered" message and indicates to the application program 22 that signaling is taking place on the terminal 50 having the identifier D6. The message 156 contains the following parameters, inter alia:

| | |
|---|---|
| Connection | D6C1, |
| alertingDevice | D6, |
| callingDevice | D1, |
| calledDevice | D2, |
| lastRedirectionDevice | D2, |
| localConnectionInfo | Alerting, |
| cause | Distributed, |
| associatedCallingDevice | D4, |
| callLinkageData | G1, T1. |

At a time t24, the announcement unit 27 sends an event message 158 to the application program 22, which event message is also referred to as a "Delivered" message and contains the following parameters, inter alia:

| | |
|---|---|
| Connection | D6C1, |
| alertingDevice | D6, |
| callingDevice | D1, |
| calledDevice | D2, |
| lastRedirectionDevice | D2, |
| LocalConnectionInfo | Alerting, |
| cause | Distributed, |
| associatedCallingDevice | D5, |
| callLinkageData | G1, T1. |

The announcement unit 27 uses the CSTA message 158 to confirm successful call forwarding. At this time, the terminal 50 signals an incoming connection request by the incoming call 64.

At a time t25, the terminal 50 sends event message 160 to the application program 22, which event message is also referred to as an "Agent Busy" message and contains the following parameters, inter alia:

| | |
|---|---|
| agentDevice | D6, |
| agentGroup | ACD-A, |
| AgentID | 120. |

The CSTA message 160 is used to inform the application program 22 that the terminal 50 is of no further use within the scope of call distribution. The reason for this is that the subscriber has taken the incoming call 64 on this terminal.

At a time t26, the line unit 40 produces an event message 162 for the application program 22, which event message is also referred to as an "Established" message and indicates to the application program 22 that an agent has answered. This message 162 contains the following parameters, inter alia:

| | |
|---|---|
| establishedConnection | D6C1, |
| answeringDevice | D6, |
| callingDevice | D1, |
| calledDevice | D2, |
| lastRedirectionDevice | D2, |
| localConnectionInfo | Connected, |
| cause | Distributed, |
| associatedCallingDevice | D1, |
| callLinkageData | G1, T1. |

The CSTA message 162 indicates to the application program 22 that call distribution has been carried out.

At a time t27, the terminal 50 produces an event message 164 for the application program 22, which event message is referred to as an EstablishedEvent message in line with the CSTA standard and contains the following parameters, inter alia:

| | |
|---|---|
| establishedConnection | D6C1, |
| answeringDevice | D6, |
| callingDevice | D1, |
| calledDevice | D2, |
| lastRedirectionDevice | D2, |
| localConnectionInfo | Connected, |
| cause | Distributed, |
| associatedCallingDevice | D1, |
| callLinkageData | G1, T1. |

The CSTA message 164 is used to confirm successful call distribution on the part of the terminal 50 as well.

Figure 3A:
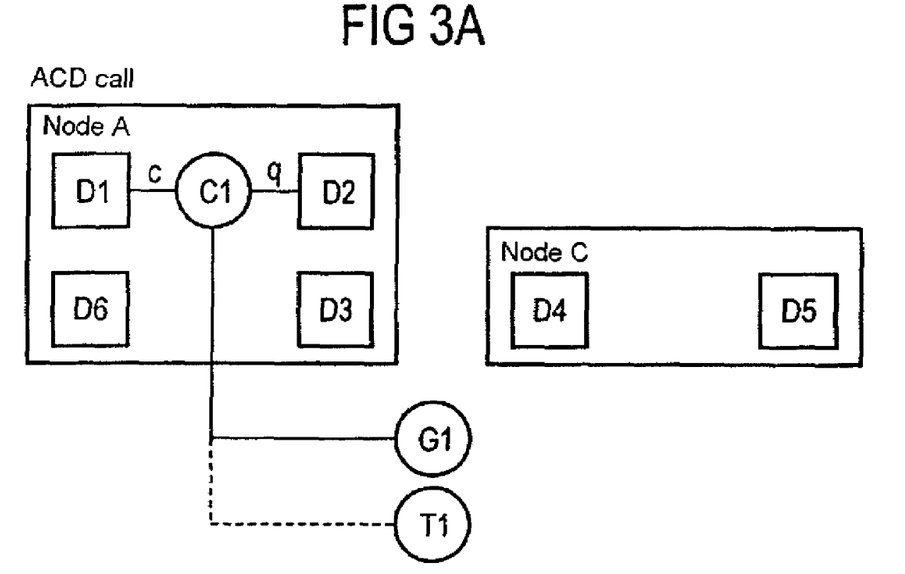
FIGS. 3A to 3C show call models for a centralized announcement function in respectively different phases.

FIG. 3A shows a CSTA model of the application program 22 at the time t6. The units having the identifiers D1, D2, D3 and D6 are associated with the communications device 12, which has the identifier "Node A" in the model. Between the unit having the identifier D1 and the unit having the identifier D2, a call has been set up using the logical connection path C1 ("Connection 1"). The connection state at the side of the terminal having the identifier D1 is "connected", see lower-case letter c ("connected"). The state of the call at the side of the terminal having the identifier D2 is "queued", see lower-case letter q ("queued"). In addition, the logical connection path C1 has the linked global identifier G1, which is used for call forwarding, in order to link two calls in different communications devices 12 and 16 to one another. A thread identifier T1 is likewise associated with the identifier C1, in order to identify the application process used for call forwarding on the computer 18. The global identifier G1 and the thread identifier T1 are, as already mentioned, explained in more detail in another context in the CSTA standard, 2000 edition.

The units having the identifiers D4 and D5 are associated with the communications device 16. The communications device 16 has the identifier "Node C" in the model.

Figure 3B:
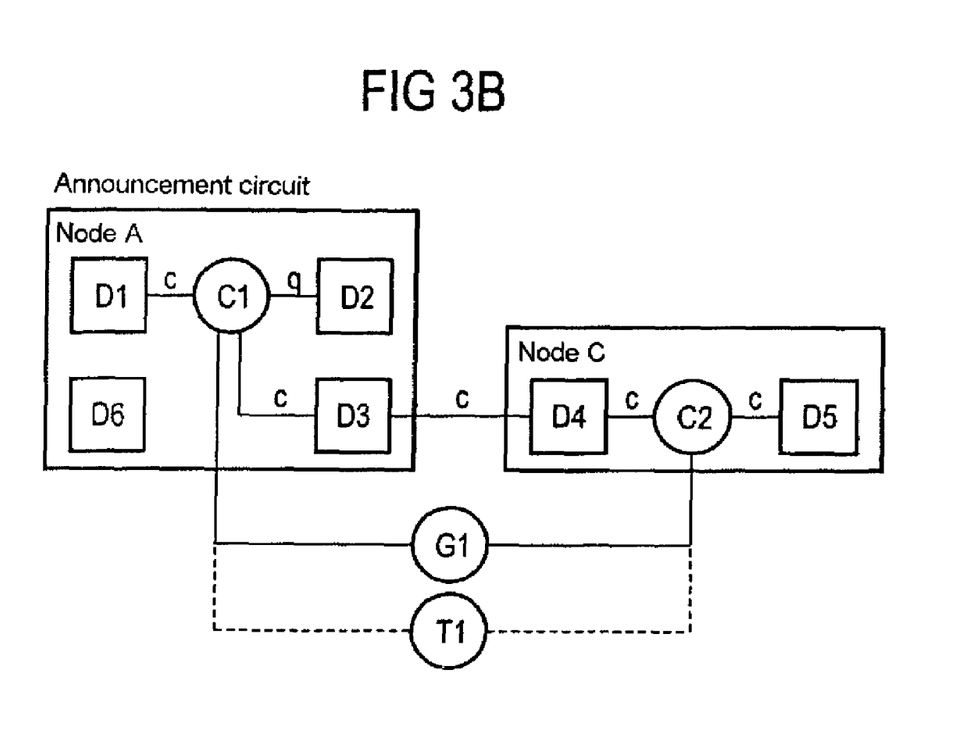

FIG. 3B shows the call model for the application program 22 at the time t14. The logical connection path C1 is still connected to the identifier D2 on a waiting basis ("queued") and is connected to the identifier D1 ("connected"). The logical connection path C1 is also connected to the identifier D3, see lower-case letter c ("connected"). The global identifier G1 is still linked to the logical connection path C1. Likewise, the thread identifier T1 is still linked to the logical connection path C1.

For the communications device 16, there are the identifiers D4 and D5 in the model of the application program 22, as already mentioned. The two identifiers are linked by a logical connection path C2 for a call which connects the interface 46 to the announcement unit 27. At the side of the identifier D3, there is a connection, see c ("connected"). Between one logical connection path C2 and the identifier D6 there is likewise a connection, see c ("connected").

The global identifier G1 is also connected to the call identifier C2. The thread identifier T1 is likewise connected to the call identifier C2.

Figure 3C:
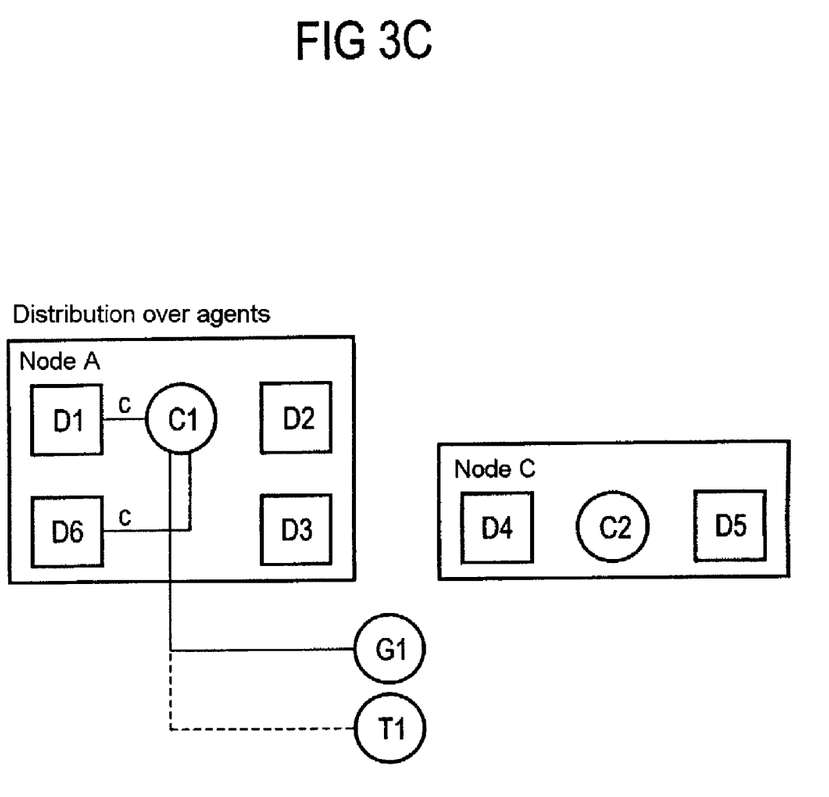

FIG. 3C shows the call model for the application program 22 at the time t27. The logical connection path C1 is now connected to the two identifiers D1 and D6, see c ("connected").

If the application program 22 fails, for example on account of a fault in the data processing installation 18 or in the data transmission network 20, then the system changes over to an emergency mode in which call distribution is initially undertaken by the group program 32. The group program 32 attempts to forward the incoming call 64 to terminals which are connected to the communications device 12 and belong to this group associated with the group program 32. If all the terminals in the group which are connected to the communications device are busy, then the incoming call is taken by an internal call answering function of the communications device 12.

The invention has been described in detail with particular reference to preferred embodiments thereof and examples, but it will be understood that variations and modifications can be effected within the spirit and scope of the invention.

What is claimed is:

1. A method for call answering in a distributed communications system comprising a plurality of decentralized switches, comprising:
   registering subscribers on communications terminals, each communication terminal being associated with one of the switches,
   receiving incoming calls at each decentralized switch;
   performing a decentralized allocation of incoming calls from each switch, the incoming calls being allocated to the communications terminals associated with the switch according to prescribed criteria,
   if a subscriber registered on the communications terminals is called by an incoming call and the subscriber is not available, performing an announcement function, and
   making an announcement from a centralized announcement device in the distributed communications system, the announcement being prompted by the announcement function, the centralized announcement device making announcements for each of the decentralized switches.

2. The method as claimed in claim 1, wherein the announcement function is activated by an application program.

3. The method as claimed in claim 2, wherein the application program, the central announcement device and the switches exchange messages among one another, the messages being at least one of control and confirmation messages.

4. The method as claimed in claim 3, wherein the messages are in a format based on the CSTA protocol.

5. The method as claimed in claim 3, wherein when the messages are exchanged, the messages are transmitted via a packet-oriented network.

6. The method as claimed in claim 4, wherein when the messages are exchanged, the messages are transmitted via a packet-oriented network.

7. The method as claimed in claim 1, wherein the central announcement device is implemented in a data processing installation.

8. The method as claimed in claim 1, wherein at least one database associated with the communications system stores an identifier for a subscriber registered in the communications system.

9. The method as claimed in claim 8, wherein the identifiers are at least one of call numbers for communications terminals and logon identifiers for subscribers registered on the communications terminals.

10. The method as claimed in claim 6, wherein the central announcement device is implemented in a data processing installation.

11. The method as claimed in claim 10, wherein at least one database associated with the communications system stores an identifier for a subscriber registered in the communications system.

12. The method as claimed in claim 11, wherein the identifiers are at least one of call numbers for communications terminals and logon identifiers for subscribers registered on the communications terminals.

13. A distributed communications system comprising:
   a plurality of communications terminals on which a subscriber can be arbitrarily registered;
   a plurality of decentralized switches, each communication terminal being assigned to one of the switches, each switch performing decentralized call allocation where incoming calls are allocated to the communications terminals assigned to the switch, according to prescribed criteria; and
   a central announcement device to produce a call answering announcement if a subscriber called by an incoming call is not available the central announcement device making announcements for each of the decentralized switches.

14. A distributed communications system comprising:
   a plurality of communications terminals on which a subscriber can arbitrarily register;
   a plurality of decentralized switches, each having an automatic call distribution module, each communication terminal being assigned to one of the switches, the automatic call distribution module of each switch allocating incoming calls to the communications terminals assigned to the switch; and
   a single, centralized announcement device to produce a call answering announcement if a subscriber called by an incoming call is not available.

15. The distributed communications system according to claim 14, wherein the announcement is a subscriber's voice mail greeting.

* * * * *